United States Patent [19]

Wu

[11] 4,003,085
[45] Jan. 11, 1977

[54] SELF-CLOCKING, ERROR CORRECTING LOW BANDWIDTH DIGITAL RECORDING SYSTEM

[75] Inventor: Chin Tao Wu, Hightstown, N.J.

[73] Assignee: RCA Corporation, New York, N.Y.

[22] Filed: July 31, 1975

[21] Appl. No.: 600,598

Related U.S. Application Data

[62] Division of Ser. No. 485,520, July 3, 1974.

[52] U.S. Cl. .................................. 360/40; 360/51
[51] Int. Cl.² .................................... G11B 5/02
[58] Field of Search ................... 360/40, 51, 52

[56] References Cited

UNITED STATES PATENTS

| | | | |
|---|---|---|---|
| 3,013,255 | 12/1961 | Cheilik | 360/51 |
| 3,108,265 | 10/1963 | Moe | 360/51 |
| 3,217,329 | 11/1965 | Gabor | 360/40 |

*Primary Examiner*—Vincent P. Canney
*Attorney, Agent, or Firm*—Carl M. Wright; Edward J. Norton

[57] ABSTRACT

Circuit for electrically recording digital data by identifying the beginning of each cell boundary with a pulse and recording an intercell transition for one binary value and no transition for the other binary value.

7 Claims, 19 Drawing Figures

SELF-CLOCKING, ERROR CORRECTING LOW BANDWIDTH DIGITAL RECORDING SYSTEM

This is a division, of application Ser. No. 485,520, filed 7/3/74.

BACKGROUND OF THE INVENTION

1. Field of the Invention

High frequency "roll-off" and lack of d.c. response limit the capability of audio tape recorders for recording digital data. High frequency roll-off limits the maximum frequency that can be recorded and causes loss of high harmonics in the recorded information. Pulses become rounded and there is a degradation of noise immunity.

2. Description of the Prior Art

In the digital recording technique Return-to-Zero (RZ), a one is represented by a pulse during a cell time and a zero by no pulse (A cell time is the time allocated to each bit and is the reciprocal of the frequency or bit rate.) The RZ recording system requires a good low frequency response to prevent bias drift in the read circuitry during long strings of zeros and also requires a synchronized clock signal to indicate the cell times.

Another technique is Non-Return-to-Zero (NRZ). The NRZ recording technique is one in which a flux transition (induces by a current change in the write head coil) from one polarity to another indicates a change in the data. That is, consecutive ones or zeros have no transition between the individual bits. A transition occurs when the data changes from a digital one to a digital zero or from a digital zero to a digital one. For randomly occurring data, the transitions tend to be more evenly distributed than in RZ recordings, but a good low frequency because of the occasional occurrence of long strings of ones or zeros.

Another technique is the Non-Return-to-Zero Inverted (NRZI). The NRZI technique records a transition for a one but not for a zero (or for a zero but not for a one). When both are used together on two concurrent tracks, timing and error correction are provided.

The energy distribution using the NRZI technique has a spectral density similar to that of NRZ. Both NRZ and NRZI require clock pulses to define the cell times and are sensitive to jitter, i.e., perturbations in timing caused by speed variations.

Another recording technique is the Manchester code or bi-phase recording. In the bi-phase recording technique, the polarity (direction) of a transition during a cell time indicates whether the recorded data is one or zero. For example, a positive transition during a cell time represents a one and a negative transition, a zero. An intercell transition, i.e., a transition at the cell boundary, is required when two bits of the same value are recorded in succession so that the transition during the cell time can be made in the required direction. Having a transition in each bit cell eliminates the need for a clock track and very low frequency response is not required. The spectral energy of bi-phase recording is concentrated at approximately 80% of the bit rate at which the data is recorded.

Another technique for recording digital data is delay modulation (DM) which records a one by a transition in either direction during a bit cell for digital one and no transition for a digital zero unless it is followed by another digital zero, in which case a transition is recorded at the intercell boundary between the two adjacent zero bit cells. Since there is a transition in at least every other cell in the bi-phase technique, the low frequency response is not critical. The lack of a transition during a zero cell when followed by a one reduces the high frequency required so that the spectral energy of a DM signal is concentrated at a frequency lower than the data bit rate, usually about 40% of the bit rate.

Another technique for recording data is pulse length modulation (PLM) or pulse width modulation (PWM) in which the data cell is divided into approximately three equal durations. A pulse extending over the first two thirds of a data cells records a one (or zero) and a pulse extending over the first one third of the data cell records a zero (or one). Data in a PLM system can be read by starting with the leading edge of a pulse a counter which counts at a rapid rate in relation to the cell time until the trailing edge of the written pulse is detected. The counter then counts in the opposite direction. If the count value returns to zero before the occurrence of the transition at the next cell boundary, one binary value is considered to have been read and if the cell boundary edge of the other cell is read before the count value returns to zero, then the other binary value is considered to have been read. The PLM technique, like bi-phase and DM, is self-clocking, i.e., no separate clock track is required. The PLM technique is especially suited for audio recordings using simple read circuitry because the direction of the transition at the pulse edges need not be detected. It has the disadvantage of being susceptible to drop out, i.e., failure to read a transition.

Frequency modulation (FM) is another recording technique in which a transition occurs at each intercell boundary with a one recorded by an intracell transition and a zero, by no intracell transition. The FM technique is self-clocking and permits a high bit packing density. It is, however, susceptible to drop out errors.

The circuit and method of this invention identifies the start of a bit cell by a relatively narrow pulse between cells. A binary digit of one value is recorded by a transition during the cell time and the other binary value, by no transition during cell time. It has the advantage of being useful in inexpensive (low bandwidth) tape recorders because signal distortions are not critical and reasonable speed changes can be tolerated; it is self-clocking, and single drop-out errors can be detected and corrected.

SUMMARY OF THE INVENTION

A circuit and method for recording digital data records a pulse to identify the beginning of each cell time. One digital value is recorded by a transition during the cell time and the other digital value is recorded by the absence of a transition during the cell time.

DESCRIPTION OF THE PREFERRED EMBODIMENT

Figure 1:
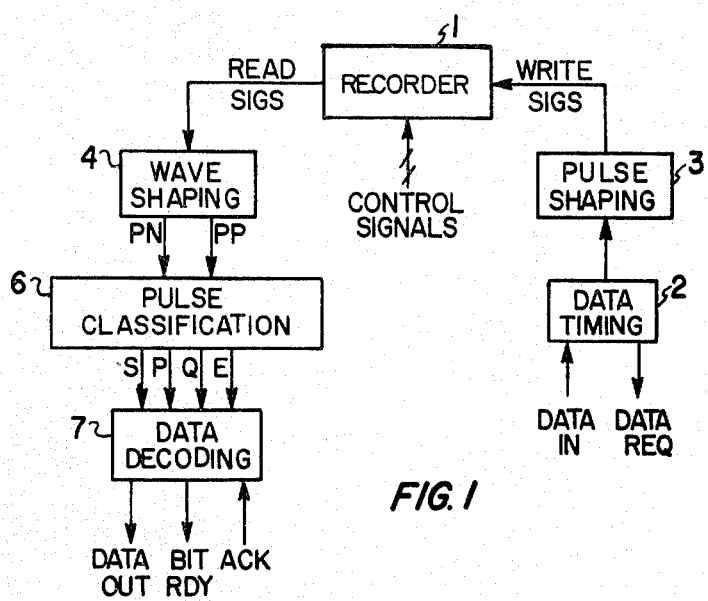
FIG. 1 is a block diagram of a system for practicing the invention.

A circuit for producing signals according to one embodiment of the invention is shown in FIG. 1. The data recorded on tape are actually domain transitions induced by the magnetic write head current at the rise and fall time of each pulse in one current direction or another. The rising edge transition will be considered positive and the falling edge will be considered negative for purposes of illustration. The read signals are currents induced in the magnetic read head by the domains and converted to voltage variations.

In the circuit of FIG. 1, signals are provided by a controller (not shown) such as a computer. The controller provides control signals to a recorder 1 for starting, stopping, and rewinding the tape and for other functions which are outside the purview of this invention. The data to be written is provided by the controller to a data timing circuit 2 which produces a data request signal to the controller when a new data bit is to be supplied from the controller. The output signals from the data timing circuit 2 are processed by a pulse shaping circuit 3 and transmitted to the recorder 1 as the write signals.

The read signals produced by the recorder 1 are first separated into positive and negative pulses by a waveshaping network 4. The output signals from the waveshaping network 4 are then classified by a pulse classification circuit 6 and the output pulses therefrom are decoded into data bits by a data decoding circuit 7. The output signals of the data decoding circuit 7 are the output data bit and a signal provided to the controller indicating that the data bit is ready. A signal is supplied from the controller that acknowledges the data bit has been received.

Controllers and similar devices are well known in the art and need not be described in detail for an understanding of the invention. (See, for example, Korn, G. A., *Minicomputers for Engineers* and *Scientists*, McGraw-Hill, 1973, Chap. 5.) The following description indicates details of the embodiment of the various circuits shown in FIG. 1.

Figure 2:
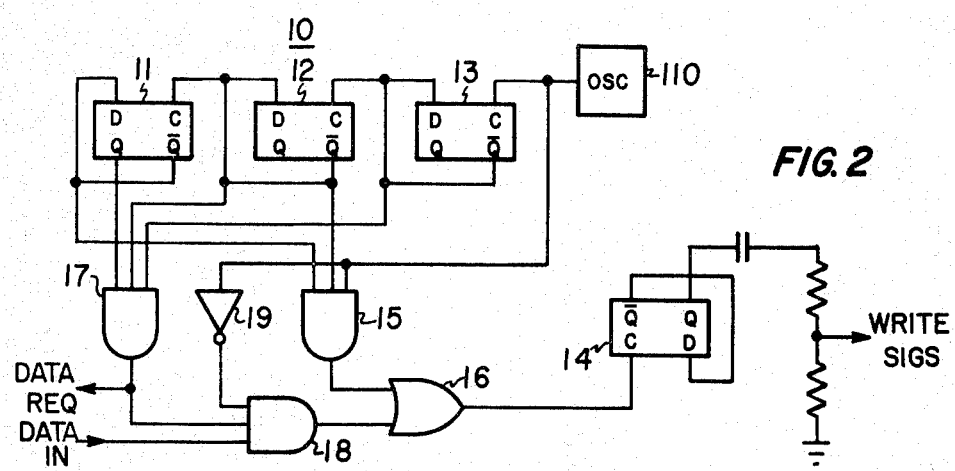
FIG. 2 is a logic diagram of the write circuitry in the system of FIG. 1.
Figure 3:
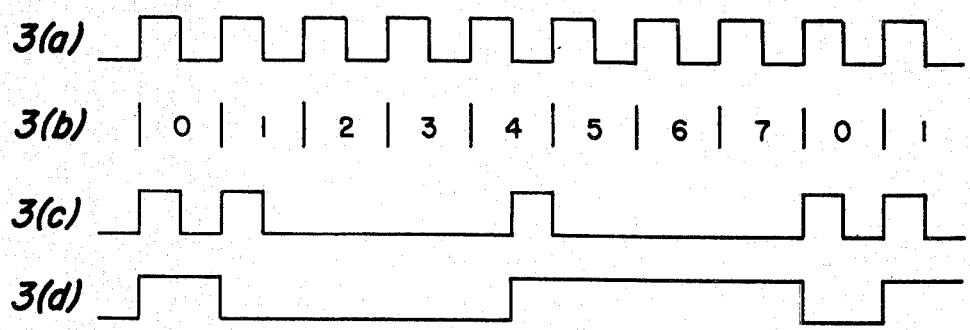
FIG. 3, including 3A through 3d, is amplitude versus time diagrams of signals in the write circuitry.

The data timing and pulse shaping circuits shown in FIG. 2 use four D-type flip-flops 11–14. A clock signal is provided by an oscillator 110 having a frequency eight times the desired bit rate. The clock waveshape is shown in FIG. 3(a). Such clock generators are well known in the art and need not be here described in detail.

Flip-flops 11–13 form a modulo-8 counter 10, the flip-flop 11 being the most significant bit and the flip-flop 13, the least significant bit. The count values are shown in FIG. 3(b) for various portions of the output signal.

An AND gate 15 is coupled to produce an output signal for each clock signal that occurs during the interval that the flip-flops 11 and 12 are reset. Thus, the AND gate 15 will produce an output pulse having the width of the clock pulse when the count value in the counter 10 is zero or one. The output signal of the AND gate 15 is coupled as an input signal to an OR gate 16, the output signal of which provides the clock input signal to the D flip-flop 14.

The D flip-flop 14 is feedback-coupled as a triggerable flip-flop so that each input pulse that occurs at the clock input cases the state of the flip-flop 14 to change. The output of the flip-flop 14 is coupled via an impedance matching network to the write signals input terminal of the recorder. The Q output signal of the flip-flop 14 is shown in FIG. 3(d). The flip-flop 14 and impedance matching network form the pulse shaping circuit 3 (FIG. 1).

The two output pulses from the AND gate 15 when the count in the counter is zero and one causes the flipflop 14 to produce an output pulse equal to one clock period. The polarity of the output pulse from the flip-flop 14 depends on the value of the data previously recorded, as will be explained in more detail below.

An AND gate 17 is coupled to the counter stages in such a manner that an output signal is produced when the count value is four. The output signal from the AND gate 17 provides an input signal to an AND gate 18, another input of which is the data bit to be written. The data bit signal is supplied by the external controller. The AND gate 18 is enabled by the output signal of an inverter 19 which complements the value of the clock signal. The output of the AND gate 18 is coupled to the OR gate 16 so that on the negative half-cycle of the clock signal with a count value of four and a data bit of one, an output pulse from the OR gate 16 changes the state of the flip-flop 14. The state of the flip-flop 14 is not changed thereafter, except for a cell boundary pulse, until another bit value of one is to be recorded.

The output signal of the AND gate 17 is transmitted to the external controller to indicate that the next data bit is to be supplied to the input terminal of the AND gate 18.

The output signal of the OR gate 16 is shown in FIG. 3(c). The signal is such that at the beginning of every cell, a pulse is recorded to identify the cell boundary and, if a binary one is to be recorded, a transition is recorded in or near the center of the cell. If a binary zero is to be recorded, no transition is recorded between boundary pulses. The waveshape shown in FIG. 3(d) of one complete cell illustrates the recording of a one. The polarity of the cell boundary pulse depends on the preceding data which determines the state of the flip-flop 14 when the cell boundary pulse is produced by the AND gate 15.

Figure 4:
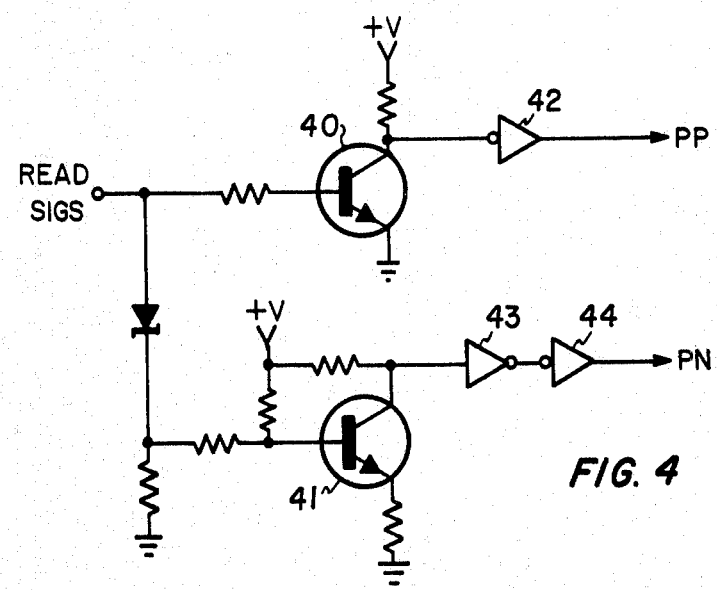
FIG. 4 is a schematic of a waveshaping circuit.

Positive and negative transitions are detected by a waveshaping circuit such as illustrated in FIG. 4. The read signals can be taken from a typical recorder directly or through an impedance matching network from the earphone jack or auxillary speaker output, for example.

Figure 5:
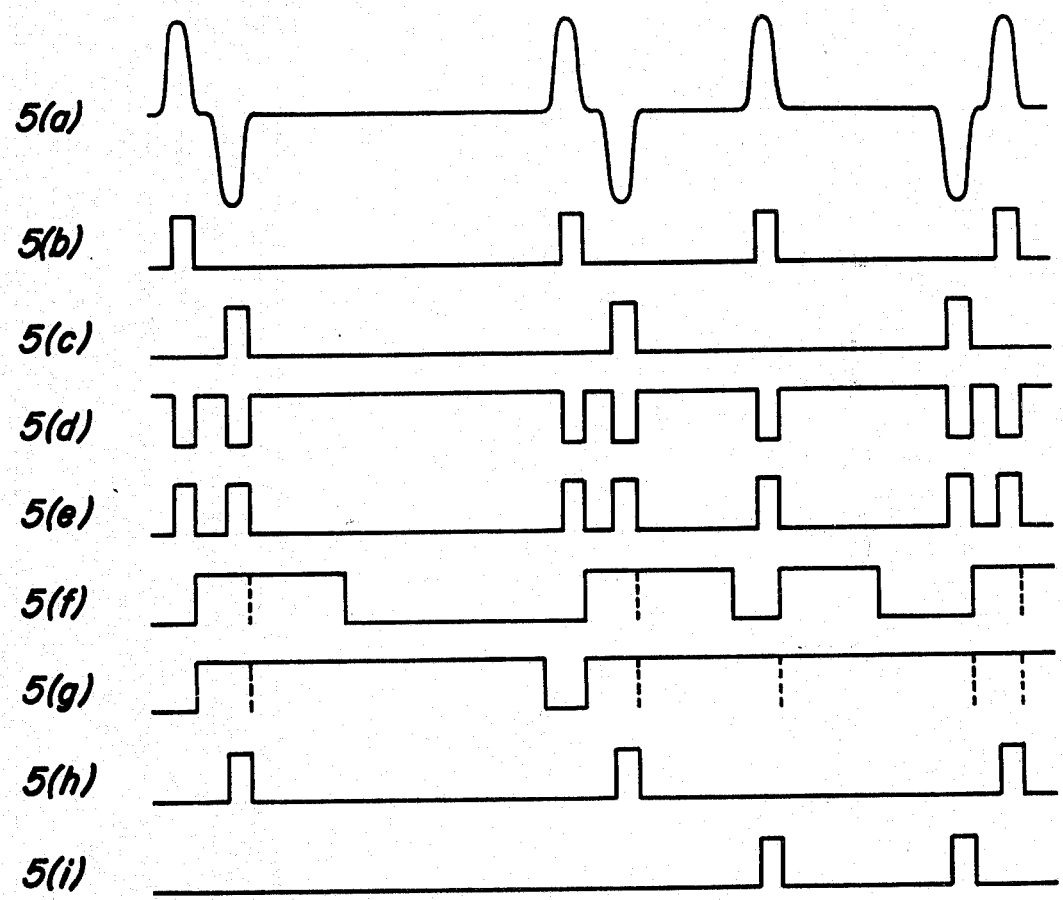
FIG. 5, including 5A through 5I, is amplitude versus time diagrams of signals in the read circuitry.

FIG. 5 shows the read waveforms at various points in the circuits to be described. The read signal from the recorder is shown in FIG. 5(a) and, as shown in FIG. 4, is applied to the bases of two transistors 40 and 41. The transistor 40 is biased so that a positive-going transition of a read signal greater than a certain voltage causes the transistor 40 to conduct producing a negative pulse at its collector. The negative pulse is inverted by an inverter 42 to provide a positive pulse when a positive current transition occurs in the read head. FIG. 5(b) shows the signal from the output of the inverter 42 as it would appear for two bit cells recording, in succession, a binary zero and a binary one.

Transistor 41 has its base biased so that the transistor 41 is normally conducting in the quiescent state. A negative transition read signal less than a certain voltage causes the transistor 41 to be cut off which in turn causes its collector to go high. The two inverters 43 and 44 provide pulse shaping and impedance matching to the following stages. FIG. 5(c) illustrates the output signals from the inverter 44 for the read signals shown in FIG. 5(a).

Figure 6:
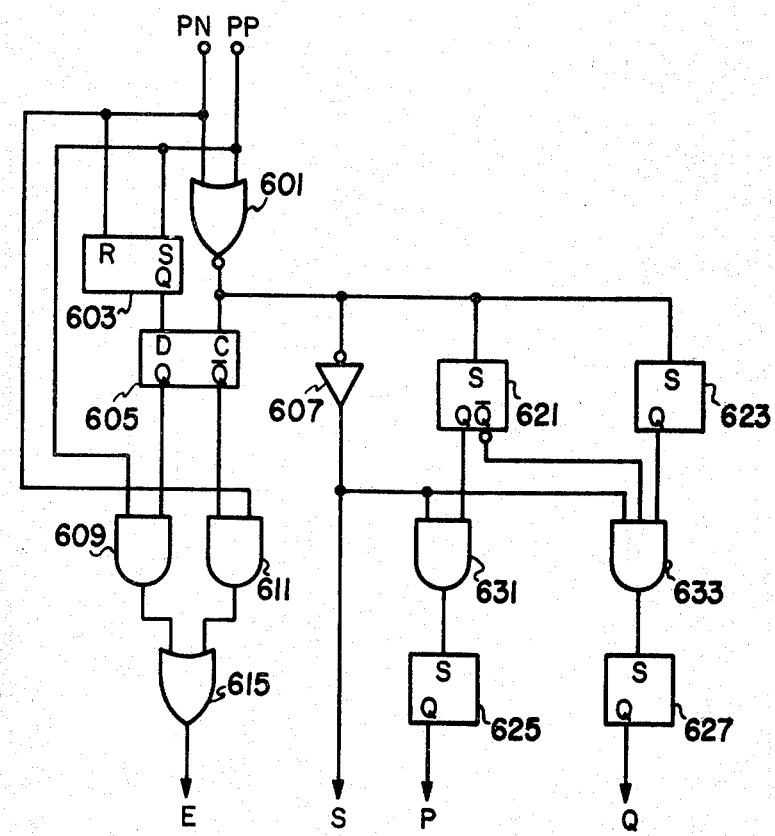
FIG. 6 is a logic diagram of a pulse classification circuit.

The pulse classification logic is shown in FIG. 6. The pulses from the inverters 42 and 44 (FIG. 4) are classified as a P pulse, i.e., a pulse occurring within one-fourth of a cell time from a preceding pulse; a Q pulse, i.e., a pulse occurring between one-fourth and three-fourths of the cell time from a preceding pulse; or an E pulse, i.e., a pulse having the same polarity as the previous pulse (which having the same polarity as the previous pulse (which indicates an error condition).

The pulses from the inverters 42 and 44 from FIG. 4 are coupled to a NOR gate 601 as shown in FIG. 6. The pulses are also applied to a SR-type flip-flop 603 so that the output signal from the inverter 42, a PP pulse, sets the flip-flop 603 and the signal from the inverter 44, a PN pulse, resets it.

When there is no input signal, the output signal of the NOR gate 601 is a high, or logical one, signal. A signal applied to either input of the NOR gate 601 causes its output signal to go low, i.e., to logical zero. When the input signals are removed, the output signal goes high causing the state of a D-type flip-flop 605 to assume the state determined by the signal at its D input terminal, which is the output signal of the set side of the flip-flop 603.

The output signal of the NOR gate 601 is inverted by an inverter 607 which will produce a positive pulse at its output for every transition read from the tape. The PP and PN inputs signals are also applied to one of two AND gates 609 and 611, whose other input signals are the output signals from the D-type flip-flop 605. The output signals from the AND gates 609 and 611 are the input signals to an OR gate 615 which produces an output signal classified as an E pulse.

An E pulse indicates the error condition of two successive pulses of the same polarity. If a positive pulse (PP) is detected, the SR flip-flop 603 is set and the D-type flip-flop 605 will be set at the end of the positive pulse. If another positive pulse occurs before a negative pulse, an output signal will be produced from the AND gate 609 which is enabled by the set output signal of the flip-flop 605 and a positive pulse (PP). If, however, a negative pulse (PN) is detected following the positive pulse, the flip-flop 603 is reset so that, at the end of the negative pulse, the flip-flop 605 is triggered to the reset state. If another negative pulse occurs before a positive pulse, the AND gate 611 will be enabled, producing an output signal indicating an E pulse via the OR gate 615.

The output signal from the inverter 607 indicates the occurrence of either a positive or a negative pulse (PN or PP) and is classified as an S pulse.

The rising edge of a output signal from the NOR gate 601 triggers two one-shot multivibrators (OSMV) 621 and 623. The duration of the set output signal from the OSMV 621 is one-quarter cell time and that from the OSMW 623, three-quarters.

The rising edge that triggers the OSMV's 621 and 623 causes a falling edge in the output signal from the inverter 607 and the resulting signal inhibits two AND gates 631 and 633.

The AND gate 633 is inhibited by the reset output signal from the OSMW 621 so that the two pulses within one-quarter cell time will not produce a Q output signal.

If the second pulse occurs after three quarters cell time, neither AND gate 631 nor 633 will produce an output signal.

The OSMV's 621 and 623 are retriggerable, i.e., if an input signal occurs during the time the OSMV is set, the timing cycle is restarted. This is distinguished from non-retriggerable OSMV's whose output pulse duration is not affected by subsequent input signals.

Two additional OSMV's 625 and 627 are provided at the outputs of the AND gates 631 and 633, respectively, to provide output signals from the pulse classification logic having a certain duration. For example, if an output pulse from the inverter 607 occurs near the end of the output signals from the OSMV's 621 or 623, the resulting output signals from the AND gates 631 and 633 can be spikes, or transients, which will produce uncertain effects on the following logic network.

The pulse classification logic illustrated in FIG. 6 produces an E pulse whenever to consecutive pulses with the same polarity occur, a P type pulse when two pulses occur within one-fourth of a bit cell time, a Q type pulse when two pulses occur in the interval of one-fourth to three-fourths of a bit cell time, and an S pulse when an input pulse of either polarity occurs.

The output signal of the NOR gate 601 is shown in FIG. 5(d) and of the inverter 607, in FIG. 5(e). The output signal from the OSMV 621 is shown in FIG. 5(f) and that from the OSMV 623 is shown in FIG. 5(g). The set output signals from the OSMV's 625 and 627 are shown in FIGS. 5(h) and 5(i), respectively, which correspond closely to the output signals from the AND gates 631 and 633.

Figure 7:
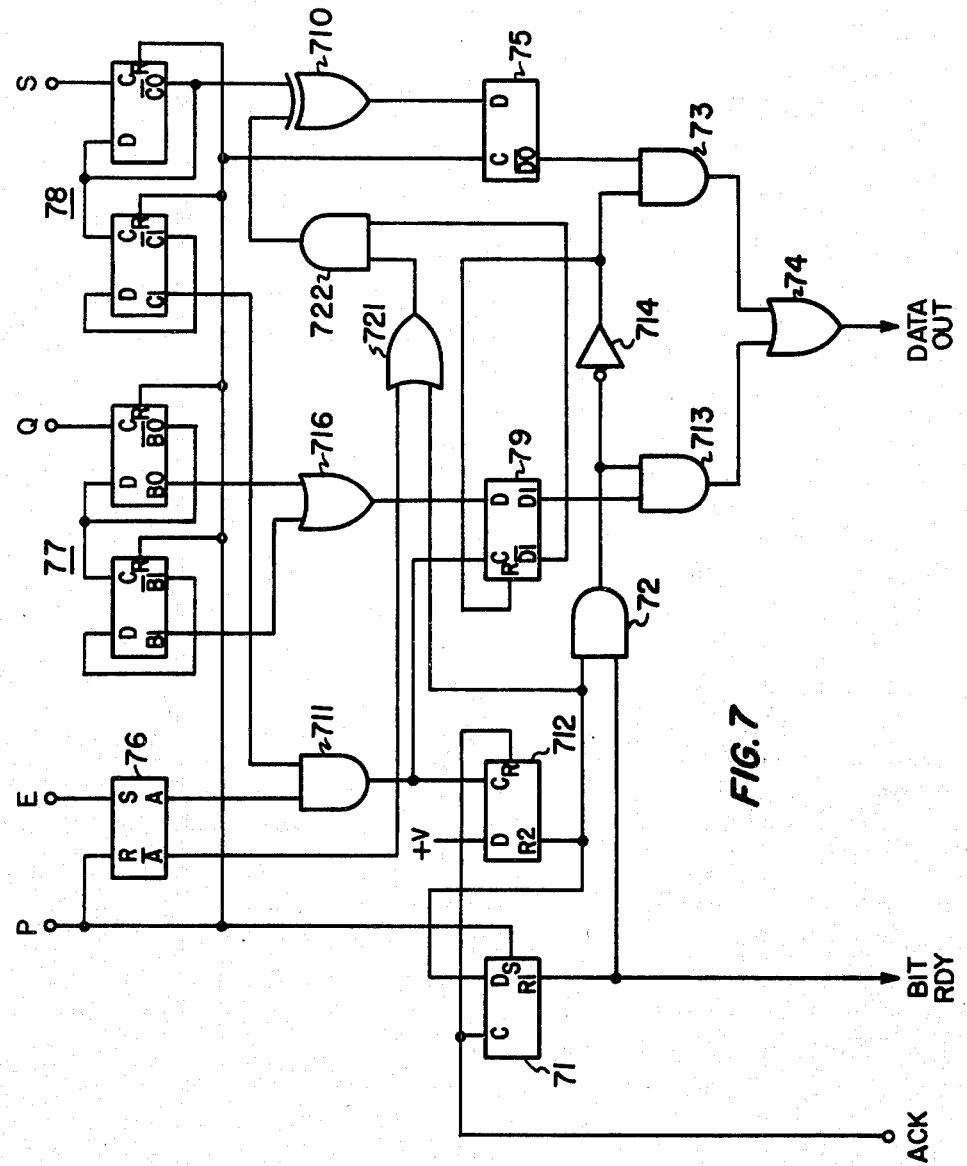
FIG. 7 is a logic diagram of a data decode circuit.

An embodiment of the data decoding circuit 7 of FIG. 1 is shown in FIG. 7. In addition to determining the value of the data read under normal conditions, the circuit of FIG. 7 also corrects data signals if an error occurs which is caused by a missing transition from the recorder.

The P pulses provide an edge set input signals to a D-type flip-flop 71, i.e., the flip-flop will be set by the rising edge of a P pulse. Normally, a P pulse indicates that a cell boundary has been detected. The set output signal from the flip-flop 71 is applied as an input signal to an AND gate 72 and also is transmitted to the controller to indicate that the data bit read from the previous cell is ready. When no error occurs, the data will be stored in a first data flip-flop 75 as described below. The flip-flop 71 is clocked by a controller signal which acknowledges that the data has been received at the controller.

The P pulse also resets an error flip-flop 76 and two counters 77 and 78 so that when the cell boundary is detected, the logic in the data decoder is initialized to read the next cell. The P pulse also clocks the data bit value into the data flip-flop 75.

A Q pulse normally indicates an intracell transition signifying a data value of binary one or the first transition of an intercell transition pulse at the end of binary one cell. The Q signal is applied to the modulo four counter 77, the set signals of which are coupled as the input signals to an OR gate 716. The output signal of the OR gate 716 primes a second data D-type flip-flop 79.

An S pulse from the inverter 607 (FIG. 6) occurs in conjunction with each P or Q pulse and triggers the second modulo four counter 78. The reset output signal from the least significant stage of the counter 78 provides an input signal to an Exclusive OR gate (XOR)

710 the other input of which is coupled to the output of an AND gate 722. The set output signal from the most significant stage of the counter 78 is coupled to an AND gate 711. The output of the XOR gate 710 provides the data input signal to the first data flip-flop 75. The output signal from the AND gate 711 clocks the flip-flop 712.

The set output signals from the flip-flops 71 and 712 are the input signals to an AND gate 72 which controls the data output signals. When both flip-flops 71 and 712 are set, the AND gate 72 is enabled causing the data signal from the output side of an OR gate 74 to be the value of the second data flip-flop 79 via an enabled AND gate 713. If either flip-flop 71 or 712 is reset, the disabled output signal from the AND gate 72 is inverted by an inverter 714 to prime an AND gate 73 which produces the data output signal from the reset side of the first data flip-flop 75 via the OR gate 74.

Single missing transitions can be corrected by virtue of the characteristics of the recording scheme. One of the correctable errors is resolved by single bit decoding but the other correctable errors require double bit decoding. Double bit error and decoding herein means that two bit cells are are required to furnish the information that determines the data value for each of the two cells.

The data and error correction decoding can be more easily understood by reference to Table I below. The double bit decoding corrections apply to the situations where one of the transitions of the intercell boundary pulse between the two cells is missed. Otherwise, the error is the single bit case. The number of error possibilities can be enumerated by noting that double correction data can occur in one of four ways: a zero bit followed by another zero bit; a zero bit followed by a one bit; a one bit followed by a zero bit; or a one bit followed by another one bit. In each of the four possible ways, either the first or second transition of the intercell boundary is missed so that there are eight double bit correction error cases. Including the normal zero and one bit cases and the single bit error correction case, there are eleven cases to be handled by the decoder and they are enumerated in Table I. On tape, there will be 22 cases because the polarity of the pulses can be reversed.

The second column of Table I, READ SIGNALS, is a symbolic representation of the data read from the tape. A 1 indicates a positive transition and a 0 indicates a negative transition. An X indicates the transition that is considered missing. A dash indicates a period of time approximately equal to half of a cell time; more exactly, more than one-fourth but not more than three fourths. Two pulses together are considered to be spaced within a fourth of a cell time. Therefore, 10-1-01 would indicate a P pulse, a Q pulse, a Q pulse and a P pulse in succession. The other 11 cases on tape can be derived by changing zeros to ones and ones to zeros.

The third column of the table, DATA, is the binary bit value corresponding to the signals indicated by the notation in the second column

TABLE I

| CASE | READ SIGNALS 1 2 34 5 67 | Data | ABC 2 | ABC 3 | ABC 4 | ABC 5 | ABC 6 |
|---|---|---|---|---|---|---|---|
| 1 | 10- - 10 | 0 | 000 | 001 | 000 | | |
| 2 | 10-1- 01 | 1 | 011 | 022 | 000 | | |
| 3 | 10-X- 01 | 1 | 000 | 101 | 000 | | |

TABLE I-continued

| CASE | READ SIGNALS 1 2 34 5 67 | Data | ABC 2 | ABC 3 | ABC 4 | ABC 5 | ABC 6 |
|---|---|---|---|---|---|---|---|
| 4 | 10- - X0- -10 | 0 0 | 000 | 000 | 101 | 101 | 102 |
| 5 | 10- - 1X- -10 | 0 0 | 000 | 001 | 001 | 001 | 102 |
| 6 | 10- - X0-1-01 | 0 1 | 000 | 000 | 101 | 112 | 123 |
| 7 | 10- - 1X-1-01 | 0 1 | 000 | 001 | 001 | 112 | 123 |
| 8 | 10-1- X1- -01 | 1 0 | 011 | 011 | 122 | 122 | 123 |
| 9 | 10-1- 0X- -01 | 1 0 | 011 | 022 | 022 | 022 | 123 |
| 10 | 10-1- X1-0-10 | 1 1 | 011 | 011 | 122 | 133 | 100 |
| 11 | 10-1- 0X-0-10 | 1 1 | 011 | 022 | 022 | 133 | 100 |

All the read signals begin with a P pulse which is indicated by a positive transition followed by a negative transition within one fourth of a cell or less. The numbers in the READ SIGNALS column heading indicate pulse times which are used to correlate the settings of the error flip-flop 76 and the counters 77 and 78. The error flip-flop 76 is designated A, the counter 77 is designated B, and the counter 78 is designated C. The counter A has a value of one when set and a value of zero when reset. The counters 77 and 78 have a value from zero to three.

The last five columns in Table I are the values of A, B, and C that correspond to the same numbered signal in the second column.

Case 1 in the table depicts the normal reading of a data cell which stores the value of zero. The P pulse occurs (time 1) and is followed by two dashes, indicating the cell time, followed by another P pulse. When the second P pulse is read, the fourth column indicates that ABC has a value of 000. The value of ABC at time 1 will always be 000 because the counters are reset by the P pulse. Therefore, no value signals are shown for time 1. No pulse is read at time 2. The fourth column (time 2) of the table therefore indicates that the value of ABC remains 000. At time 3, the leading edge of the boundary pulse triggers the C counter to a value of one so that the value of ABC at time 3 is 001. At time 4, the trailing edge of the boundary pulse generates a P pulse to reset the counter and ABC has a value of 000 at time 4.

In case 2, a one is recorded in a cell. At time 2, a Q pulse is detected and increments the B value to 1 and an S signal increments the C value to 1. Therefore, at time 2, the value of ABC is 011. At time 3, the negative transition of the boundary pulse, indicated by the zero, produces another Q signal and again increments both the B and C counters so that the value of ABC is 0.22. The following positive transition at time 4 generates a P pulse and resets ABC to 000.

Cases 3 through 11 are those in which a transition is missed and the data can be reconstructed. Case 3 is unique in that it is the only single bit error correction; it occurs when a transition in the middle of a cell is missed. At time 2, therefore, the value of ABC remains 000 because no pulse is read. At time 3, the negative transition is recognized as an error because a negative transition preceded it at time 1 so that A is set and the presence of the pulse increments the value of C so that the value of ABC is 101. The positive transition at time 4 produces a P pulse which resets the ABC value to 000.

The operation of the circuit in FIG. 7 will now be described for the single data cases 1–3. Initially, the flip-flop 76 and the counters 77 and 78 are reset. At time 3 in case 1, the C0 stage of the counter 78 will be set by the leading edge of the intercell boundary pulse. The XOR gate 710, which operates as a gated inverter, will invert the value of the reset output signal from the CO stage of the counter 78 when the second data flip-flop 79 is reset and the error flip-flop 76 is reset or the flip-flop 712 is set. Therefore, in case 1, the second P pulse will clock the first data flip-flop 75 to the set state, reset the counters, and set the flip-flop 71 on the rising edge. Since the flip-flop 712 is reset, the output signal of the AND gate 72 will be disabled and the output signal of the inverter 714 will enable the AND gate 73 which gates the reset output signal from the first data flip-flop 75 to the data output terminal. The first data flip-flop 75 is set for case 1 to the reset output signal is zero which is gated to the data output terminal. When the data bit has been accepted by the controller, the acknowledge (ACK) signal will clock the flip-flop 71 to the reset state because its D input signal is a logical zero from the set output side of the flip-flop 712 which is reset. The circuit is then ready for the next bit cell.

In case 2 where a binary one is stored, the value in the counter 78 when the second P pulse occurs will be two. The CO stage of the counter 78 will be reset and the first data flip-flop 75 will be reset by the P pulse. The reset output signal from the flip-flop 75 will be a logical one so that the data bit output signal from the OR gate 74 will be a binary one.

In case 3, the intracell transition pulse is missed and the counters 77 and 78 are the same as case 1, reading a zero. The error flip-flop 76 will be set by the falling edge of the intercell boundary pulse (time 3). The reset output signal from the flip-flop 76 will be a logical zero and disable the OR gate 721 because the flip-flop 712 is reset. Therefore, the AND gate 722 will be disabled and the XOR gate 710 will not invert the signal from the CO stage of the counter 78.

The next P pulse will clock the flip-flop 75 reset and the resulting data output signal will be a one from the reset side of the flip-flop 75.

Cases 4-11 in Table I are double bit corrections so that when the data detection is completed, two bits of data must be transferred to the controller. When a double bit error occurs, the flip-flop 76 will be set and the C1 stage of the counter 78 will also be set indicating two pulses have been counted. When these two signals are activated, the AND gate 711 will be enabled, producing an output signal that will clock the flip-flops 712 and 79. The flip-flop 712 will be set by the clock pulse because the D input signal is coupled to voltage indicating a logical one signal. The flip-flop 79 will be set if the first bit of the two cells is a one, i.e., if the value in the counter 77 is not zero.

When a P pulse is recognized, the flip-flop 71 is set by the rising edge indicating to the controller that the data is ready for transfer. The output signals from the flip-flops 71 and 712 will enable the AND gate 72 which will read the data from the set side of the flip-flop 79 via the AND gate 713 and the OR gate 74 to the data output terminal. The acknowledge pulse will clock the flip-flop 71 which will remain in the set condition because the flip-flop 712 was set. The flip-flop 712 will be reset by the acknowledge pulse.

The bit ready signal to the controller will be maintained, but the AND gate 72 will be disabled so that the next data bit will be read from the reset side of the first data flip-flop 75. When the AND gate 72 is disabled, the rising edge at the output terminal of the inverter 714 will reset the second date flip-flop 79, an edge triggered flip-flop.

The data bit to be set into the second data flip-flop 79 is determined at the same time the error flip-flop 76 is set when the counter 78 has counted to two. The other bit to be stored in the flip-flop 75, is determined at the occurrence of the terminating P pulse. In cases 4 and 5, the output signal of the AND gate 711 is a rising edge at the leading edge of the second P pulse which occurs in Table I at time 6. For cases 6 and 7, it occurs at the intercell transition pulse of the second cell, i.e., at time 5. For case 8, it occurs at time 4; for case 9, at time 6; for case 10, at time 4; and for case 11, at time 5. The preceding column in each case indicates the value that will be clocked into the flip-flop 79. It can be seen from the table that the first data bit stored in the flip-flop 79 will be a one if any Q pulses have been counted as indicated by stages B0 or B1 being in the counter 77. This condition is detected by the OR gate 716 which primes the D input terminal of the flip-flop 79. The second cell's data is the complement of the value stored in the CO stage of the counter 78 if the flip-flop 79 is set. If the flip-flop 79 is reset, the second output data bit is the same as the value stored in the CO stage of the counter 78.

Other errors are possible that will not be detected by the logic network shown in FIG. 7, but most controllers and computers have data security checks such as parity checks that can be used to maintain data integrity.

Figure 8:
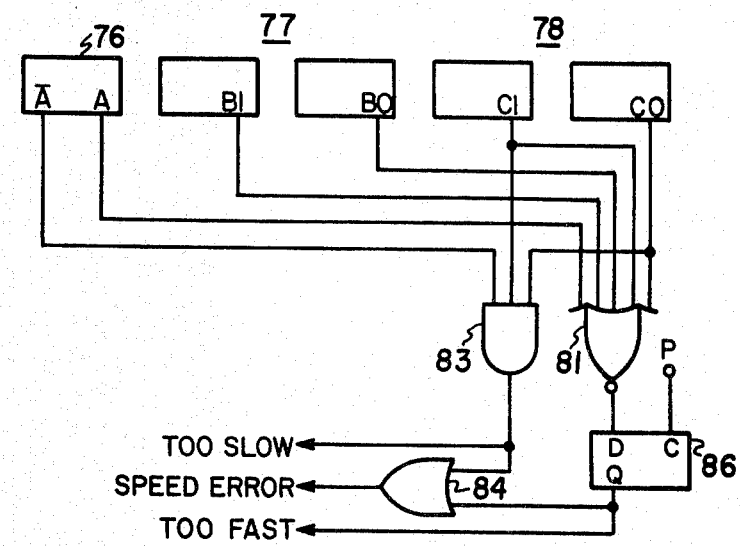
FIG. 8 is a logic diagram of a speed detection circuit.

The settings of the counters 77 and 78 and the register 76 in FIG. 7 can be used to detect a speed error. The speed error can be detected by a circuit such as that illustrated in FIG. 8. If a P pulse occurs when the registers 76 and the counters 77 and 78 are all reset, the tape is running too fast. In FIG. 8, the NOR gate 81 produces a high output signal when the counters 77 and 78 are set at zero and the flip-flop 76 is reset. The P pulse provides the clock input to a flip-flop 86 whose set output signal indicates the tape is running to fast. If both stages of the counter 78 are set and the error flip flop is reset, the output signal of an AND gate 83 indicates that the tape is running too slow. The two speed error signals can be combined by an OR gate 84 to indicate that an error exists. The output signals indicating the speed errors can be used to stop the machine and indicate an error, or to control the speed of the motor in the recorder.

Various modifications to the systems and circuits described and illustrated to explain the concepts and modes of practice of the invention might be made by those of oridinary skill in the art within the principle or scope of the invention as expressed in the appended claims.

What is claimed is:

1. In a system for sensing a record medium having at least two possible recording states, the combination comprising:
    sensing means for producing a read signal in response to a change of state on said record medium; and
    data decoding means responsive to said read signal for detecting a cell boundary when two read signals occur within an interval not greater than one-half the time between cell boundaries and for producing data output signals when a single read signal occurs within cell boundaries.

2. The invention claimed in claim 1 further including error means responsive to said sensing means for producing an error signal when two changes of recording states indicate a change of state intermediate said last-mentioned two changes did not produce a read signal.

3. The invention claimed in claim 2 further including error correction means responsive to said error means and to said data decoding means for providing correction signals to said data decoding means.

4. The invention claimed in claim 1 wherein said sensing means includes waveshaping means responsive to said read signal for producing output signals indicative of the direction of change in recording state.

5. The invention claimed in claim 4 wherein said data decoding means includes pulse classification means responsive to the output signals from said waveshaping means for producing output signals indicative of a class of pulse.

6. The invention claimed in claim 5 including speed detection means responsive to said data decoding means for producing signals indicative of the speed of the relatively moving medium.

7. In a recording system for use with a record medium having at least two possible recording states, the combination comprising:
pulse means for producing pulses at a predetermined rate;
signal means responsive to said pulse means and to data to be recorded for producing a data signal when said data has a given value; and
recording means responsive to said pulse means and to said signal means for recording on said record medium two successive changes of state in response to said pulses to indicate a cell boundary and a single change of state between successive cell boundaries in response to said data signal.

* * * * *